Figure 1:
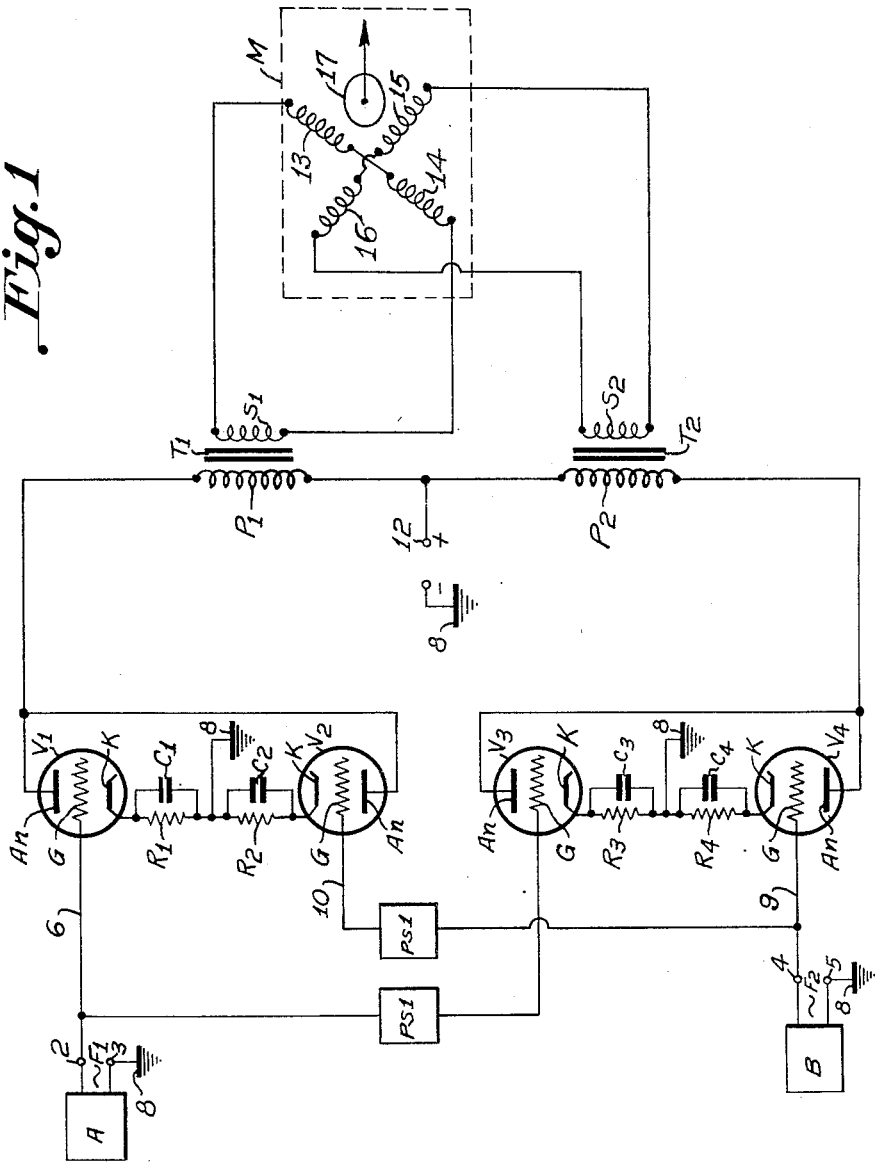

Dec. 5, 1950          J. F. ALLEN          2,532,435

FREQUENCY COMPARATOR

Filed June 20, 1947          2 Sheets-Sheet 1

INVENTOR.
John F. Allen
BY
ATTORNEY

Dec. 5, 1950   J. F. ALLEN   2,532,435
FREQUENCY COMPARATOR

Filed June 20, 1947   2 Sheets—Sheet 2

INVENTOR.
John F. Allen
BY
ATTORNEY

Patented Dec. 5, 1950

2,532,435

UNITED STATES PATENT OFFICE 2,532,435

FREQUENCY COMPARATOR

John Forbes Allen, Maroubra, Sydney, New South Wales, Australia, assignor to Amalgamated Wireless (Australasia) Limited, Sydney, New South Wales, Australia, a company of Australia Application June 20, 1947, Serial No. 755,843
In Australia October 23, 1946

6 Claims. (Cl. 318—207)

This invention relates to frequency comparators and more particularly to frequency comparators of the electromechanical type.

Devices of the type referred to are usually employed for the purpose of indicating and/or utilizing any frequency difference which may occur between two independent frequency supply sources.

Frequency comparators of the electro-mechanical type usually employ an electric motor in which the relative direction and extent of movement of the armature with respect to its stator is made dependent upon the direction and extent of the frequency deviation between two sources of frequency supply whose frequencies are to be compared.

In most cases one source of frequency supply is employed as a reference frequency and is derived from a stabilized frequency source such as a crystal controlled oscillator or the like.

These known devices are particularly adapted for use in automatic frequency control applications employed for controlling or stabilizing the frequency of operation of an oscillation generator such as a frequency modulated oscillation generator for use in a transmitter or an oscillation generator for use in a receiver of the heterodyne type.

In one known system of this type the armature of the motor is mechanically coupled to the frequency controlling element of the unstabilized frequency source; and alternating potentials from the stabilized and unstabilized frequency supply sources are mixed in a pair of split phase balanced modulators. The output beat frequencies from the balanced modulators are applied to the stator windings of the motor in such a manner as to produce a field which is rotating at the beat frequency. The direction of field rotation is such as to cause the armature of the motor to turn in that direction which will cause the frequency of the unstabilized source to be varied to a value such as will reduce to zero the frequency of the beat in the output of the modulators.

The object of the present invention is to provide an efficient frequency comparator of the electro-mechanical type in which the necessity for utilizing split phase balanced modulators is avoided.

A further object of this invention is to provide a novel method and means for comparing the frequency of two alternating currents of H. F. and of producing energy representative of relative shifts in frequency in said alternating currents and of utilizing the energy so produced to control the frequency of one of said currents in a sense which tends to maintain said currents in step over an indefinite period of time.

The above objects are achieved in accordance with the present invention in a frequency comparator comprising a motor having two field windings disposed in space quadrature, a first frequency source and means for applying operating potentials from said source to said motor to produce a first rotating magnetic field, a second frequency source and means for applying potentials from said second source to said motor to produce a rotating field whose direction of rotation is opposed to that of said first mentioned magnetic field, a movable member disposed within said magnetic fields, means for converting a difference in phase between said magnetic fields into equivalent mechanical movement of said movable member, and means for utilizing said mechanical movement.

Figure 2:
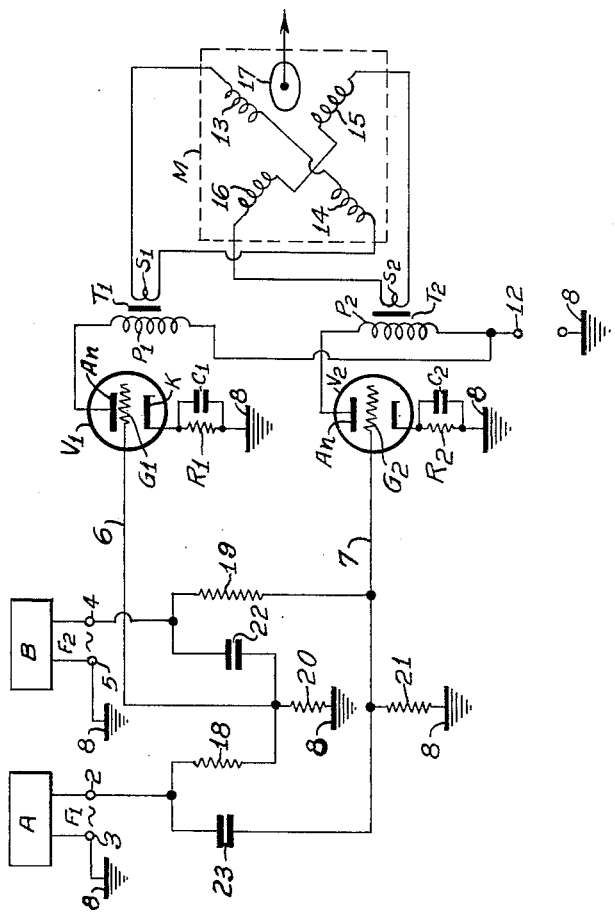

For a more complete understanding of the invention and the manner in which it is to be carried out attention is directed to the following description in connection with the accompanying drawing Figure 1 of which illustrates one practical embodiment of the invention, and Figure 2 of which illustrates a modified embodiment.

Referring to Figure 1, independent frequency supply sources generally indicated by the rectangles A and B are connected to the terminals 2—3 and 4—5 respectively.

The source A provides, at the terminals 2—3, alternating potentials of a substantially constant frequency F1 at approximately 1000 cycles, such as may be obtained for example from a crystal controlled oscillator by the use of conventional frequency divider networks. This source is the reference frequency and is hereinafter referred to as the standard frequency.

The source B provides, at the terminals 4—5, variable frequency alternating potentials F2 of approximately 1000 cycles such as may be obtained for example from an unstabilized oscillator in a radio transmitter or the oscillator of a heterodyne receiver by the use of suitable frequency divider networks.

Alternating potentials of frequency F1 from the high potential terminal 2 of the source A are fed in phase to the control grid G of the valve V1, through the lead 6, and are fed in phase quadrature to the control grid G of the valve V3 through a phase shifting device PS1 and the lead 7.

The cathodes K of the valves V1—V3 are connected to earth 8, through the customary resistance capacity biassing networks R1C1, R3C3 respectively. The terminal 3 of the source A is also connected to earth 8, thus completing the input circuits of the valves V1—V3.

In like manner alternating potentials of frequency F2 from the source B are impressed in phase quadrature relationship on the control grids G of the valves V2 and V4. The high potential terminal 4 of the source B is connected to the control grid of the valve V4 through the lead 9 and to the control grid of the valve V2 through the lead 10 and the phase shifting device PS2. Biassing potentials developed across individual resistance capacity biassing networks R2C2 and R4C4, respectively, connected between cathode and ground of the valves V2 and V4, are applied to the respective control grids through the grounded terminal 5 of the source B.

The phase shifting devices PS1 and PS2 may be of any conventional construction, such as will produce the desired quadrature phase rotation of the alternating currents passed through them.

The anodes An of the valves V1 and V2 are connected together and to the positive terminal 12 of a potential supply source (not shown), through the primary winding P1 of a step down impedance matching transformer T1. The secondary winding S1 of the transformer T1 is connected to apply energy potentials to the outer terminals of one pair of serially connected stator windings 13—14 in the motor M.

The anodes An of the valves V3 and V4 are also connected together and to the positive terminal 12 of the potential supply source (not shown) through the primary winding P2 of an audio frequency transformer T2 similar to the transformer T1. The secondary winding S2 of the transformer T2 is connected to impress energizing potentials across the second pair of serially connected stator windings 15—16 of the motor M.

The negative terminal of the aforesaid potential supply source is connected to the ground 8.

The value of the operating potentials applied to the electrodes of the valves V1, V2, V3 and V4 is such as to cause said valves to function as class A amplifiers.

The serially connected coils 13—14 are mounted with their common axis perpendicular to that of the serially connected coils 15—16. An armature 17 of magnetisable material is arranged to have freedom of rotation about the intersection of the axes of the coils 13—14 and 15—16.

In the operation of the present system a voltage of frequency F1 is applied in phase to the grid G of valve V1 and in, say, leading phase quadrature to the grid G of the valve V3. The amplified energy at frequency F1 in the output circuit of valve V1 is applied to the stator windings 13—14 of the motor M. Amplified energy at frequency F1 in the output circuit of V3, which is in leading phase quadrature relationship to the energy at frequency F1 in the output circuit of V1 is applied to the serially connected stator winding 15—16 of the motor M, to produce a rotating field of rotational frequency F1 in, say, a clockwise direction between the coils.

The frequency F2 is applied simultaneously in phase to the grid G of valve V4 and in relatively leading phase quadrature to the grid G of V2. The amplifier energy at frequency F2 in the output circuit of the valve V2 is applied to the coils 13—14 of the motor M, whilst the phase displaced amplified energy in the output circuit of the valve V4 is applied to the coils 15—16. This results in the production of a rotating field of rotational frequency F2 in an anti-clockwise direction between the coils.

The resultant field which is a combination of two approximately equal fields rotating in opposite directions at slightly differing angular velocities, oscillates about a line intersecting the fields at the frequency $\frac{1}{2}(F1+F2)$ while the line itself rotates in a clockwise or in an anti-clockwise direction at a rotational frequency $\frac{1}{2}(F1\sim F2)$ depending on the nature of the deviation of the frequency F2 with respect to the frequency F1.

The armature 17, which as already pointed out is constructed of magnetic material, is needle-shaped or of like elongated form, and is suspended in any convenient maner so as to have a freedom of rotation about the intersection of the axes of the coils. This armature 17 sets itself so that its major dimension is parallel with the line of the resultant field because the field of the induced magnetism is always opposite in sense to the inducing field and the resulting couple always tends to turn the needle-shaped armature into the line of the resultant field.

If the frequency of the generator B is the same as the frequency of the standard source A the resultant field set up between the stator coils of the motor M will have no rotational movement and the armature 17 will remain stationary. If the frequency of the wave energy from the source B shifts to one side or the other of the frequency of the source A the direction of rotation of the resultant field will likewise vary, thus producing a corresponding change in the direction of rotation of the motor armature 17.

If for any reason the application of wave energy of frequency F2 from the source B is discontinued, the rotating field set up in the stator coils of the motor by the wave energy of frequency F1 remains. A rotation of the armature 17 of the motor by this remaining field can only be produced by "eddy current action." This undesirable rotation of the armature 17 can be prevented by making the armature of finely divided magnetic material of high resistivity such as magnetite. Alternatively, if the frequency F2 vanishes, the circuit may be arranged in known manner to remove also the frequency F1 by applying biassing potential to an amplifying valve through which the frequency F1 passes.

The relative phase relationship existing between the frequencies F1 and F2 may be indicated by the use of an indicating scale associated with the armature.

The provision of a mechanical link in any convenient manner between the armature and the frequency controlling element of the source B provides a ready means for automatically maintaining synchronism between the frequencies being compared.

The arrangement of the linkage should be such that the movement of the armature 17 of the motor M will produce an equivalent movement of the tuning element of the generator B in a direction such as will cause the frequency delivered to the terminals 4—5 to approach synchronism with the frequency of the standard source A at the terminals 2—3.

Although the present example has been described with respect to the use of separate triode valves, it is not to be restricted in this respect as any convenient type of valve may be employed and the electrode systems of the valve pairs V1—V2 and V3—V4 may be housed within a common envelope.

The individual biassing networks may be dispensed with and a common cathode biassing resistor employed for each pair of valves V1—V2 and V3—V4.

For example, in Figure 2 in which like parts have been designated by reference characters similar to those in Figure 1, the valve pairs V1—V2 and V3—V4 have been replaced by the single triode valves V1—V2 respectively.

Alternating potentials of frequency F1 from the high potential terminal 2 of the source A are fed in phase to the control grid G1 of valve V1 across the resistor 20, through the resistor 18 and the lead 6, and in leading phase to the control grid G2 of the valve V2 acros the resistor 21, through the condenser 23 and the lead 7.

The condenser 23 and resistor 21 constitute a conventional phase shifting network in which the phase of the potentials applied to the grid G2 of the valve V2 from the source A is advanced through an angle of approximately 90 degrees relative to the phase of the potentials applied to the grid G1 of the valve V1 from the same source.

In similar manner alternating potentials of frequency F2 from the source B and from the high potential terminal 4 are applied in phase to the grid G2 of valve V2 across the resistor 21 through resistor 19 and the lead 7 and in leading phase to the grid G1 of valve V1 across the resistor 20 through condenser 22 and lead 6. The condenser 22 and resistor 20 constitute phase shifting means whereby the phase of the potentials applied to grid G1 of valve V1 from the source B are advanced through an angle of approximately 90 degrees relative to the phase of the potentials applied to grid G2 of valve V2 from the same source.

The circuit elements 18—19—20—21—22 and 23 are so proportioned that the potentials produced at grids G1 and G2 from each of the sources A and B are of approximately equal amplitude and quadrature phase.

The cathodes K of the valves V1—V2 are connected to earth 8 or point of zero potential through the customary resistance capacity biassing networks R1—C1 and R2—C2. It will be appreciated, however, that the cathodes K may be connected directly to earth, and suitable biassing potentials from any convenient sources applied to the respective grids G1—G2 of valves V1 and V2 through the resistors 20—21 in known manner.

The input circuits of the valves V1—V2 are completed by connecting terminals 3 and 5 of the sources A and B respectively to earth 8.

The anode An of the valve V1 is connected through primary P1 of a suitable transformer T1 to the positive terminal 12 of a potential supply source (not shown). Secondary winding S1 of the transformer T1 is connected to apply energy potentials to the outer terminals of one pair of serially connected windings 13—14 of motor M.

In like manner the anode An of valve V2 is connected through the primary P2 of transformer T2 (similar to transformer T1) to the positive potential supply terminal 12. Secondary winding S2 of the transformer T2 is connected to apply energy potentials to the outer terminals of the second pair of serially connected stator windings 15—16 (similar to stator windings 13—14).

The value of the operating potentials applied to electrodes of the valves V1 and V2 in Figure 2 is such as to cause them to function as class A amplifiers.

As the physical arrangement of the component parts of the motor M and the fundamental operation of the system as a whole is the same as that described in connection with Figure 1, further description is considered unnecessary.

Although the frequency comparator arrangement of the present invention has been described in its application to the maintenance of synchronism between two frequencies it will be appreciated, however, that the system provides a source of 2-phase currents which may be supplied to any suitable load circuit and used for any desired purpose.

I claim as my invention:

1. The combination of first and second electron discharge means each including input and output terminals, first and second frequency sources, means connected to apply from said first source to the input terminals of said first and second electron discharge means potentials which are of said first frequency and are in phase quadrature, means connected to apply from said second source to the input terminals of said first and second electron discharge means potentials which are of said second frequency and are in phase quadrature, an electric motor having first and second field windings disposed in space quadrature, means connecting the output terminals of said first electron discharge means to the first of said field windings, and means connecting the output of said second electron discharge means to the second of said field windings.

2. The combination of first and second electron discharge means each including input and output terminals, first and second frequency sources, means connected to apply from said first source to the input terminals of said first and second electron discharge means potentials which are of said first frequency and are in phase quadrature, means connected to apply from said second source to the input terminals of said first and second electron discharge means potentials which are of said second frequency and are in phase quadrature, an electric motor having first and second field windings disposed in space quadrature, means connecting the output terminals of said first electron discharge means to the first of said field windings, means connecting the output of said second electron discharge means to the second of said field windings, and an armature inductively related to said field windings and movable in accordance with difference in the phase of the magnetic fields of said windings.

3. The combination as claimed in claim 1, characterized in that said first electron discharge means is a triode having its input connected to said first source through a resistor and to said second source through a capacitor and said second electron discharge means is a triode having its input connected to said first source through a capacitor and to said second source through a resistor.

4. The combination as claimed in claim 1, characterized in that said first electron discharge means is a pair of diodes having a common output circuit and having one input terminal connected directly to said first source and another input terminal connected to said second source through a phase shifting device and said second electron discharge means is a pair of triodes having a common output circuit and having one input terminal connected directly to said second source and another input terminal connected to said first source through a phase shifting device.

5. The combination as claimed in claim 1, characterized in that said field windings are arranged to produce a resultant field which is a combination of two approximately equal fields rotating in opposite directions at slightly differing angular velocities.

6. The combination as claimed in claim 1, characterized in that the means connecting the output terminals of said first and second electron discharge means to said field windings include transformers having their primary windings connected in series and their secondary windings each connected in series with a different one of said field windings.

JOHN FORBES ALLEN.

REFERENCES CITED

The following references are of record in the file of this patent:

UNITED STATES PATENTS

| Number | Name | Date |
| --- | --- | --- |
| 1,873,842 | Hyland | Aug. 23, 1932 |
| 1,934,400 | Bollman | Nov. 7, 1933 |
| 2,385,641 | Peterson | Sept. 25, 1945 |